UNITED STATES PATENT OFFICE.

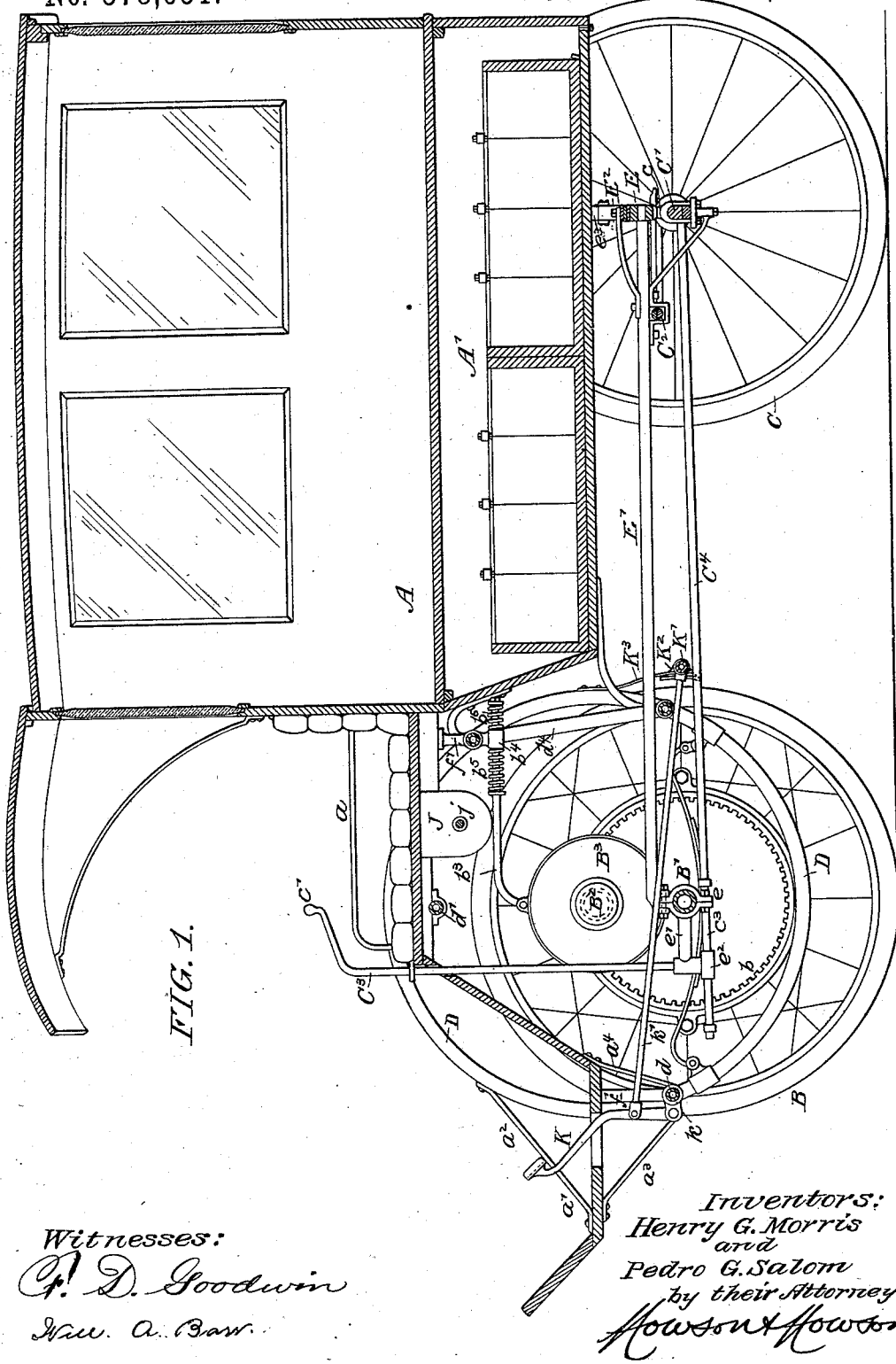

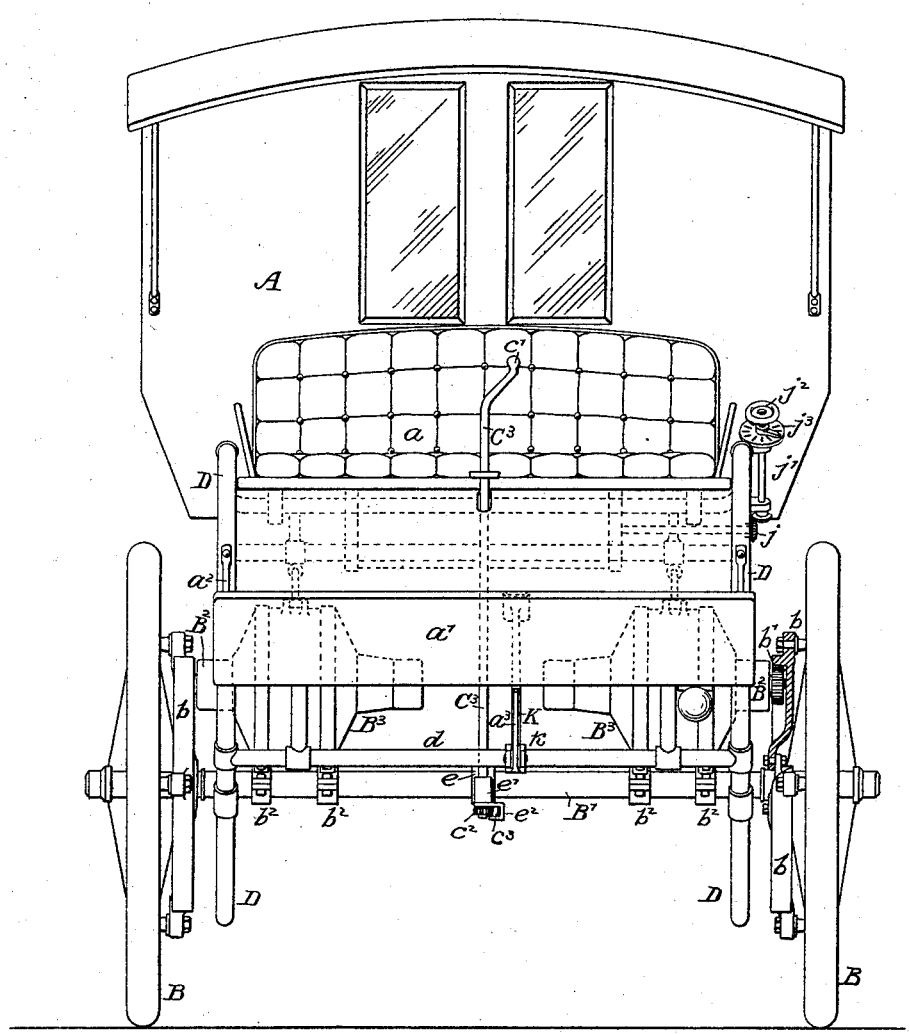

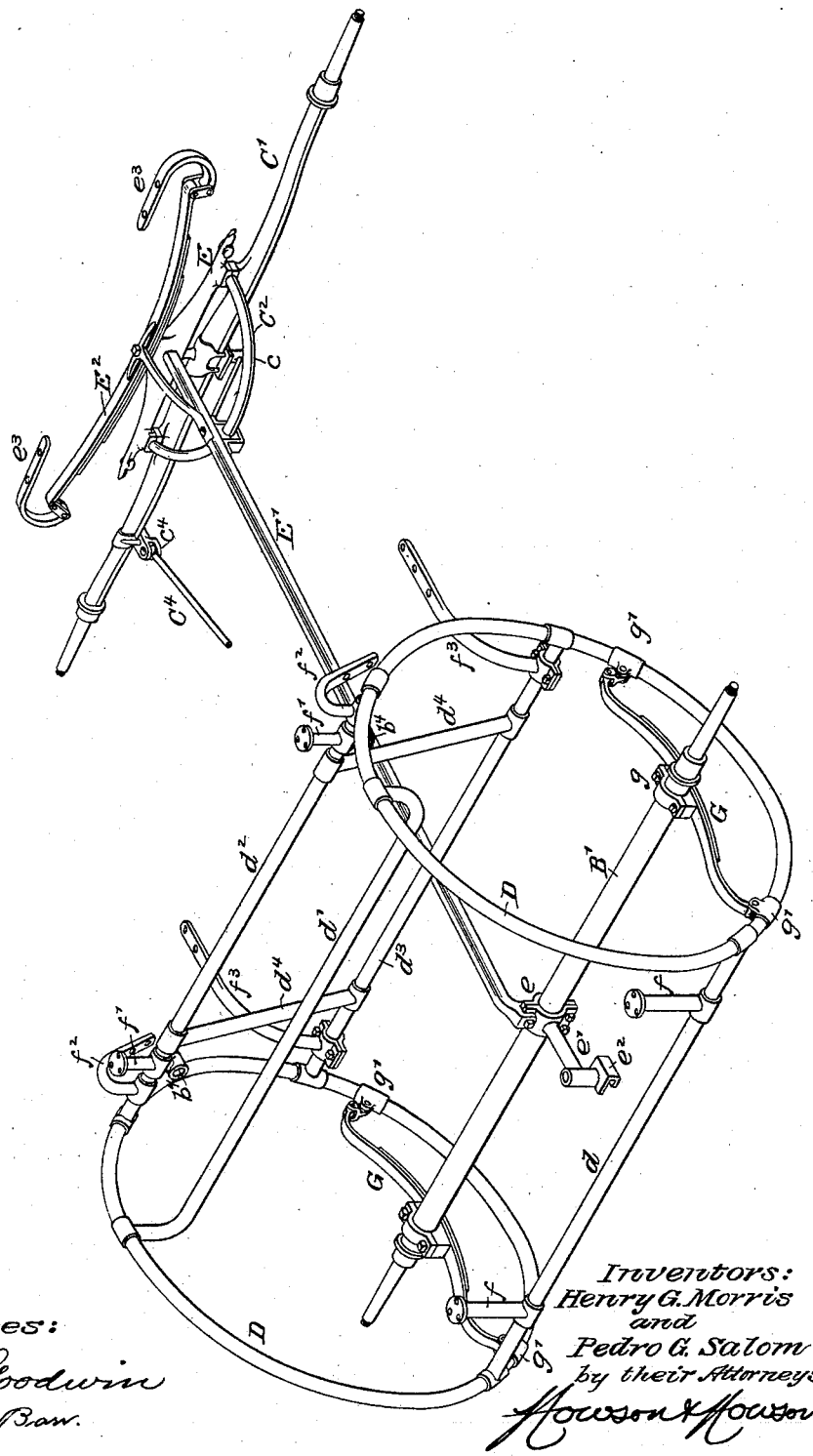

HENRY G. MORRIS AND PEDRO G. SALOM, OF PHILADELPHIA, PENNSYLVANIA.

MOTOR-PROPELLED VEHICLE.

SPECIFICATION forming part of Letters Patent No. 578,651, dated March 9, 1897.

Application filed July 6, 1896. Serial No. 598,211. (No model.)

*To all whom it may concern:*

Be it known that we, HENRY G. MORRIS and PEDRO G. SALOM, citizens of the United States, and residents of Philadelphia, Pennsylvania, have invented certain Improvements in Motor-Propelled Vehicles, of which the following is a specification.

The object of our invention is to so construct the frame of a motor-propelled vehicle that it can be made of light material and at the same time be perfectly rigid and capable of sustaining the weight of the loaded vehicle-body.

Our invention relates to the details of construction, as fully described hereinafter, reference being had to the accompanying drawings, in which—

Figure 1 is a longitudinal sectional view of a delivery-wagon, illustrating our invention. Fig. 2 is a front view of the wagon. Fig. 3 is a perspective view of the frame and running-gear with the wheels and body removed.

It will be understood that while we have illustrated our invention in combination with a delivery-wagon it may be used with any style of vehicle without departing from our invention.

A is the wagon-body, having the driver's seat $a$, foot-board $a'$, and a compartment $A'$ for the storage of the battery-cells. The vehicle herein shown is driven by electric motors from storage batteries.

The forward wheels B B are the driving-wheels, mounted on the axle $B'$, and on each wheel is a gear-wheel $b$, having internal teeth meshing with the pinions $b'$ on the motor-shaft $B^2$. There are two motors $B^3$, one at each side, and one motor drives one wheel and the other motor drives the other wheel, so that the two wheels are driven independently to enable them to more readily turn curves, as fully described in a companion application filed by us on the 20th day of June, 1896, Serial No. 596,343.

The motors $B^2$ in the present instance are mounted directly above the axle $B'$, and each motor-frame has boxes $b^2$, which are adapted to the axle, and connected to the upper portion of each motor is a rod $b^3$, mounted in a bearing $b^4$, and on one side of this bearing is a spring $b^5$ and on the opposite side is a spring $b^6$, confined to the rod $b^3$, so that the jar of the vehicle as it is propelled will be taken up by the springs $b^5$ $b^6$, the slight movement of the motor not interfering in any way with the gearing.

C are the rear wheels, mounted on the axle $C'$. This axle in the present instance is similar to an ordinary carriage-axle and is provided with a fifth-wheel or segment $C^2$, of the ordinary construction, so that the axle can turn on the pivot $c$. The movement of this axle is controlled by a steering-shaft $C^3$, having a handle $c'$ within easy reach of the operator and having at its lower end a pinion $c^2$, engaging with a rack $c^3$ on the rod $C^4$, connected at $c^4$ to the axle $C'$, so that when the shaft $C^3$ is turned the axle will be moved on its pivot to properly direct the vehicle.

The cross-bar E, to which the upper portion of the fifth-wheel or segment is attached, is connected to the front axle $B'$ by the perch $E'$, having at its end a clamp-block $e$. One-half of this block has a projecting bearing $e'$ and a slideway $e^2$ for the shaft $C^3$ and rack-rod $C^4$, respectively.

The forward frame of the vehicle is made of tubes, and at each side is a circular tubular section D. These sections are connected together by transverse tubular rods $d\ d'\ d^2\ d^3$, thus making a perfectly rigid and light structure. On the transverse tube $d$ are mounted the supports $f\ f$ for the foot-board $a'$ of the vehicle. The transverse tube $d'$ carries the forward portion of the seat $a$, and projecting from the tube $d^2$ are the supports $f'$ for the rear portion of the seat $a$, and projecting rearward from the tube $d^2$ are bent irons $f^2$, which in the present instance are secured to the end of the main body of the vehicle, and projecting rearwardly from the transverse tubes $d^3$ are irons $f^3$, which are secured to the under side of the body, so that it will be seen that the front portion of the body of the vehicle is rigidly secured to this tubular framework.

The axle $B'$ is secured to blocks $g$, mounted on springs G, which are coupled to clips $g'$ on the circular tubular sections D, as shown clearly in Fig. 3, so that the axle $B'$ extends through the tubular sections, and the motors which are mounted on the axles are within the framework above described and are protected by the said framework.

Suitable brace-rods $a^2$ $a^3$ $a^4$ are secured to the tubular frame and act as stays for the foot-board, and in order to add stiffness to the structure we connect the tubular rods $d^2$ $d^3$ with brace-tubes $d^4$.

K is the foot-lever for the brake. This lever is pivoted to a clip $k$, secured to the transverse tube $d$, and connected to this lever is a rod $k'$, which is attached to the transverse brake-beam K′, having shoes $k^2$. The brake-beam and shoes are supported by spring-plates $k^3$, secured to the circular tubular sections D D of the frame.

The controller J is situated in the present instance under the seat $a$, and its shaft $j$ is geared to a shaft $j'$ at one side of the vehicle, and this shaft $j'$ has a hand-wheel $j^2$ within easy reach of the operator, and below the hand-wheel is a dial $j^3$, and on the shaft is an indicator-arm.

The rear portion of the body is supported by an ordinary elliptical spring $E^2$, hung to the body by clips $e^3$, the spring being mounted on the cross-bar E.

By the above construction we are enabled to make the frame of the vehicle very light yet perfectly rigid to withstand the strains to which it is subjected and also to so form it that the parts are accessible at all times, and, furthermore, the motors are protected.

We claim as our invention—

1. The combination in a motor-propelled vehicle, of the frame having circular end sections connected together and an axle mounted on said frame, substantially as described.

2. The combination in a four-wheeled vehicle, of the front and rear axles connected together by a perch, a frame consisting of two circular sections carrying one axle and transverse pieces connecting the circular sections together, substantially as described.

3. The combination in a motor-propelled vehicle, of the front axle, driving-wheels thereon, with a pivoted rear axle having wheels thereon, means for turning the said axle, a frame consisting of two circular tubular sections connected together by transverse tubes, springs coupled to the circular sections and supporting the front axle and means for driving the wheels on the front axle, substantially as described.

4. The combination in a motor-propelled vehicle, of the front axle, driving-wheels thereon, two electric motors mounted on the front axle, one motor geared to one driving-wheel and the other motor geared to the other driving-wheel, a rear axle, wheels thereon, a pivot for the rear axle, steering mechanism connected to the rear axle and tubular framework supporting the front axle and the forward portion of the body of the vehicle, the rear portion of the vehicle being supported by the rear axle, substantially as described.

5. The combination in a motor-propelled vehicle, of the circular tubular sections D D, cross-tubes $d$, $d'$, $d^2$, $d^3$ connecting the circular sections together, front and rear axles, wheels therefor, the vehicle-body having a seat and foot-board, the foot-board being secured to the cross-tube $d$, the seat being mounted on the cross-tubes $d'$, $d^2$ and the main body of the vehicle being coupled to the tubes $d^2$, $d^3$ the rear of the vehicle being supported by the rear axle, substantially as described.

6. The combination in a motor-propelled vehicle, of the front axle, driving-wheels thereon, a pivoted rear axle, wheels thereon, a steering-shaft at the forward end of the vehicle having a pinion, a rod connected to the rear axle at one side of the pivot and having a rack at its opposite end with which the pinion meshes so that on turning the shaft the rear axle will be turned upon its pivot, substantially as described.

7. The combination in a motor-propelled vehicle, of the tubular framework, a front axle, its springs secured to the framework, a pivoted rear axle, a cross-bar above the rear axle, a perch extending from said cross-bar to the front axle, a block $e$ on the end of the perch, a bracket extending from said block and carrying a bearing and a slideway, a steering-shaft adapted to the bearing and a rod geared to said steering-shaft and adapted to the slideway, said rod being coupled to the rear shaft, substantially as described.

8. The combination in a motor-propelled vehicle, of the front and rear axles, driving-wheels on the front axle, a frame consisting of two circular tubular sections connected together by cross tubes or rods, clips on the said circular sections, springs coupled to said clips and adapted to the front axle, two motors mounted on the axle, one motor gearing with one driving-wheel and the other motor gearing with the other driving-wheel, bearings $b^4$ on the tubular frame, a rod $b^3$ coupled to each motor and extending through the bearing and two springs on the rod, one on one side of the bearing and the other on the opposite side of the bearing, substantially as described.

In testimony whereof we have signed our names to this specification in the presence of two subscribing witnesses.

HENRY G. MORRIS.
    PEDRO G. SALOM.

Witnesses:
    WILL. A. BARR,
    JOS. H. KLEIN.